United States Patent [19]

Schieber

[11] Patent Number: 4,654,242

[45] Date of Patent: Mar. 31, 1987

[54] SELF-SUPPORTING, DIMENSIONALLY STABLE CARBON COMPOSITE MEMBER AND A METHOD OF PRODUCING IT

[75] Inventor: Franz Schieber, Röthenbach a.d. Pegnitz, Fed. Rep. of Germany

[73] Assignee: Conradty Nurnberg GmbH & Co., KG, Rothenbach a.d. Pegnitz, Fed. Rep. of Germany

[21] Appl. No.: 761,469

[22] Filed: Aug. 1, 1985

[30] Foreign Application Priority Data

Sep. 24, 1984 [DD] German Democratic Rep. ...................... 3435044

[51] Int. Cl.⁴ ............................................. D04H 1/08
[52] U.S. Cl. ........................................ 428/36; 156/89;
156/155; 423/447.2; 428/213; 428/218;
428/244; 428/280; 428/281; 428/282; 428/283;
428/408; 428/920
[58] Field of Search ............... 428/280, 281, 282, 283,
428/408, 213, 36, 218, 244, 920; 156/89, 155,
309.9, 322; 423/447.2

[56] References Cited

U.S. PATENT DOCUMENTS 4,234,650  11/1980  Schieber .............................. 428/408
4,279,952  7/1981  Kodama et al. ..................... 428/281

Primary Examiner—James J. Bell
Attorney, Agent, or Firm—Pennie & Edmonds

[57] ABSTRACT

A self-supporting, dimensionally stable carbon composite member or laminar carbon member, having a plurality of carbon felt layers adhesively joined to a thin, uniformly thick polygranular carbon members. The carbon members are formed by applying a shearing force, through a roller, to a plastically deformable carbon composition having a filler and a coke binder. The amount of binder varies, from 50 to 150% by weight relative to the filler material, depending on whether the filler is composed of granular, or pulverulant, and/or fibrous carbon particles. To form the carbon composite member, two different method may be used. In the first method, the rolled carbon member is subjected to a thermal treatment to harden the binder. A binder is then applied between the carbon member and the carbon felt layer. All three components are then subjected to a thermal treatment that consolidates or hardens the binder. Alternatively, the carbon composite member can be formed by taking the carbon member after it has been rolled, placing carbon felt layer on the carbon member, and the subjecting of the components to a thermal treatment. In this process, the binder will harden so as to adhere the carbon members and carbon felt layers together.

17 Claims, 6 Drawing Figures

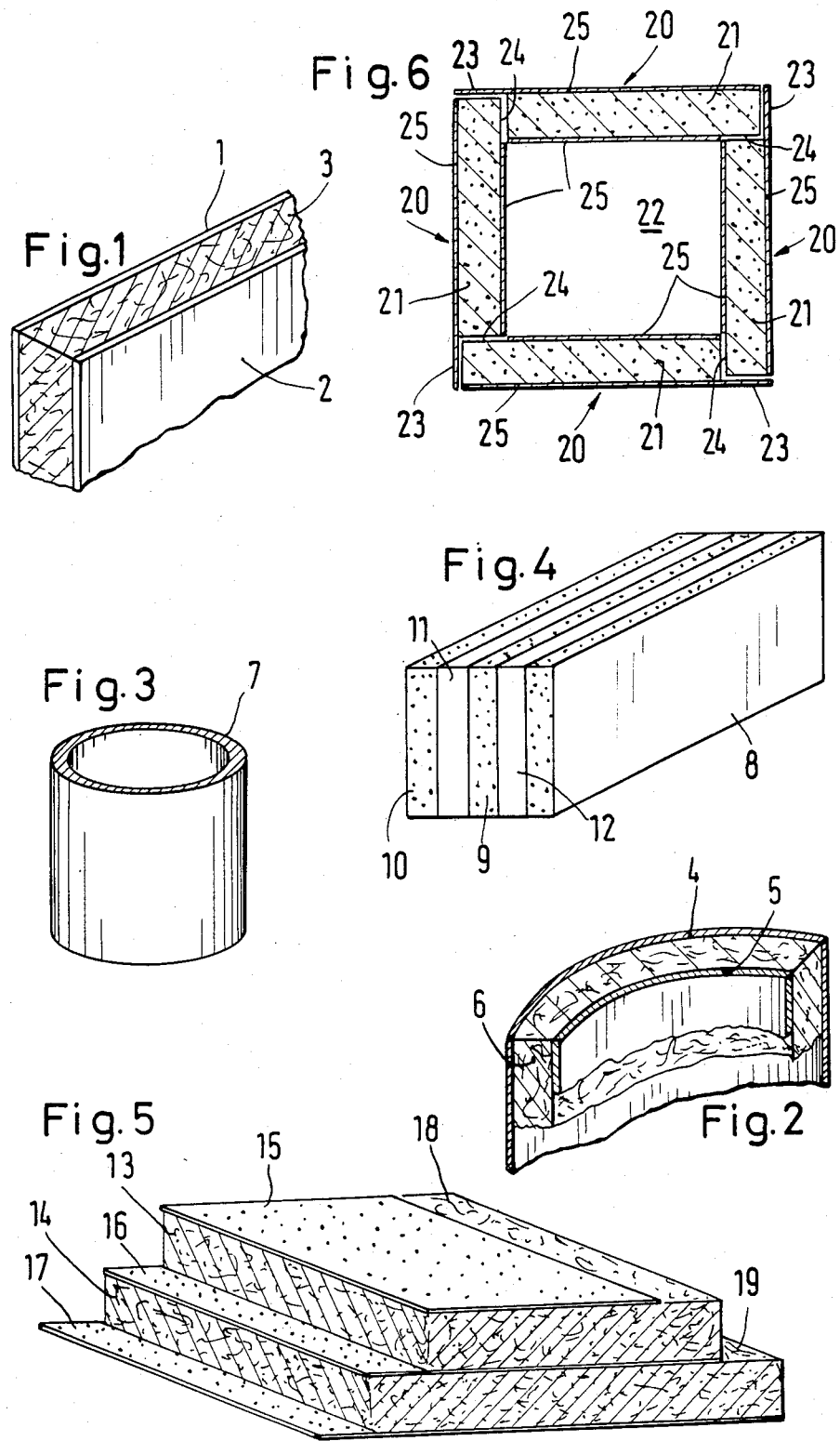

SELF-SUPPORTING, DIMENSIONALLY STABLE CARBON COMPOSITE MEMBER AND A METHOD OF PRODUCING IT

BACKGROUND OF THE INVENTION

The invention relates to a self-supporting, dimensionally stable carbon composite member of a plurality of carbon layers joined together as well as to a method of producing it.

DESCRIPTION OF THE PRIOR ART

Self-supporting carbon composite members are known. They consist of a plurality of carbon felt layers stacked one onto the other, which are prior to curing (hardening) and coking adhesively joined spotwise with a carbonaceous cement. The dimensional stability of such composite members leaves, however, to be desired.

In another known carbon composite member, a plurality of carbon felt layers are coated on their outer surfaces with a binder, which serves to adhesively join together the individual layers. In that connection, the binder at least partly penetrates into the free pore space of the felt, so that the adjacent pores on the surface are at least partly filled with binder, while the pores disposed further within are provided with correspondingly less filling. The carbon felt layers, hence, are not impregnated with the binder uniformly, so that there is provided an inhomogeneous distribution in the carbon felt member which involves drawbacks particularly in cases, in which importance is attached to a good thermal insulation.

Furthermore, there is known a carbon member of high porosity, low gross or green density and heat conductivity, which consists of single-layer or multi-layer carbon or graphite felt that has been impregnated with a carbonaceous binder and has been subsequently coked or, respectively, graphitized through the action of pressure and heat, and which exhibits a relatively low green or gross density and a high dimensional stability, with a part of the binder having been removed prior to coking or, respectively, graphitization from the felt by means of having been pressed-off, rolled-off or the like. This carbon member involves the advantage that it is dimensionally stable and has a relatively low density and heat conductivity and, moreover, can be produced with large dimension, the porosity that is present throughout in these products, however, is in many cases undesirable.

SUMMARY OF THE PRESENT INVENTION

It is therefore an object underlying the invention to design the self-supporting carbon composite member of the type as mentioned such that it meets extreme requirements particularly concerning its dimensional stability, thermal insulation and electrical properties, such as they occur on the field of high-temperature technique, for example nuclear reactor operation, and of electrochemistry as well as in the construction of high-temperature power plants (transmissions).

It is a further object of the invention to provide a carbon composite member the gas permeability should be purposively adjustable.

It is still a further object of the invention to provide a method for manufacturing such a carbon member in an economical way. These and other objects are accomplished according to one aspect of the invention through one or more layers of carbon felts and one or more thin, sheet-like polygranular carbon members adhesively joined to the former and consisting of granular or, respectively, pulverulant and/or fibrous carbon particles as filler materials and of a coked binder, which carbon members have been shaped through the influence of shearing forces from a plastic carbon composition (mass) with a binder proportion of from 50 to 150% by weight, based on the filler material, into thin, plate-like shaped carbon members and have been subjected to a first thermal treatment and have thereafter been subjected, together with the carbon felt or felts, to a second thermal treatment for consolidating the carbonaceous binder in the configuration of the composite member, which binder is arranged between the carbon members and the carbon felts assembled with them.

According to a further aspect of the invention, these objects are accomplished by one or more layers of carbon felts and one or more thin, sheet-like polygranular carbon members adhesively attached to the former and consisting of granular or, respectively, pulverulant and/or fibrous carbon particles as filler materials and of a coked binder, which carbon member has at first been produced as a thin, plate-shaped, green member through the influence of shearing forces from a plastic carbon composition (mass) having a binder content of from 50 to 150% by weight, based on the filler material, and has been assembled thereafter with one or more layers of carbon felts and has been subjected, for consolidation of the binder, to a thermal treatment.

DESCRIPTION OF THE DRAWINGS

FIG. 1 is a prospective view of an insulation element;

FIG. 2 is a prospective view of a curved portion of a cup-shaped carbon composite member;

FIG. 3 is a prospective view of a single layer tubular hollow member formed from a single sheet of a carbon member.

FIG. 4 is a prospective view of a five layer carbon composite member;

FIG. 5 is a prospective view of a multi-layer insulation member having stepped outer edges; and FIG. 6 is a plan view of a rectangular tube formed by four plate-shaped composite members.

DETAILED DESCRIPTION OF THE PRESENT INVENTION

The carbon composite member according to the invention consequently is put together of substantially plane-parallel layers of carbon felts layered one onto the other and of at least one plate-shaped carbon member of a special type, which is designated as thin and sheet-like, and which in the case of an embodiment of the invention, in which only a single felt layer is utilized, covers the two surfaces of said felt layer.

The plate-shaped carbon member of the special kind consists of a mixture of granular or, respectively, pulverulant and/or fibrous carbon particles as filler materials, such as coke, carbon black, natural or synthetic graphite or the mixtures thereof, as well as of a carbonaceous binder, for which, according to a further embodiment of the invention, phenol formaldehyd resin, furan resin, tar, pitch or other mixtures have proved particularly serviceable. The binder content amounts to from 50 to 150% by weight, based on the filler material, and hence is comparatively high.

This polygranular carbon member becomes the carbon member as a part of said composite member in that a plastically deformable carbon composition (mass) is produced from granular or, respectively, pulverulant and/or fibrous carbon particles as filler materials and from a carbonaceous binder, which composition is roller out to a film-like plate in a roller gap (nip), which is defined by unheated rollers, under the influence of shearing forces at room temperature, i.e. about 18° C. There now are two possibilities for the further course followed in production. Firstly, the plate rolled out in this manner can be subjected to a thermal treatment for condensation and/or coking the binder, and at least one carbon felt layer can be placed either individually or in plural number onto the thus provided sheet-like plate that is resistant to bending and stable in shape, said carbon felt layer being inseparably joined through adhesive attachment to the plate or plates.

According to an alternative prosecution of the process, the thin structure of plastic carbon composition rolled out in the manner of a film can be at first assembled with the carbon felt layer or layers and thereafter be subjected to the temperature treatment as a composite member which thus already is involved. In this case, too, an inseparable connection between the carbon felt layer or layers and the sheet-like carbon material is attained, the binder that is in the carbon material serving as adhesive, but additional binder may also still be applied prior to the temperature treatment onto the surfaces to be adhesively joined.

The layer-like or sandwich-like structure of the carbon composite member according to the invention, in which the individual layers consist of the characterized, different carbon materials, form a thermal unsulation member of excellent insulation properties, which are to be traced back to the fact that the carbon felt layers due to their pore volume act as good heat conduction barriers, and the sheet-like carbon members disposed therebetween distribute, despite of the insulation effect of the carbon felts, heat passing through them uniformly over the entire surface area of the next following layer in that they ensure a rapid lateral dissipation of the heat passing through. In this manner, so-called "hot-spots", hence, spots of extensive overheating on account of heat concentrations are avoided in a high temperature insulation, which consists of that kind of a carbon composite member material.

Furthermore, the sheet-like carbon member also serves on or between the carbon felt layers as gas passage barrier; hence, considerable advantages are attained by the carbon composite member described here in cases, in which not only a good thermal insulation is to be attained but, rather, a gas passage therethrough is to be avoided and the oxidation of the felt material caused under certain circumstances thereby, with the consequence that the insulation properties thereof are impaired.

The carbon composite member may have a plate-shaped configuration, but it may also be bent in ring-shaped manner, or it may be in the form of a tube, viz. in adaptation to the respective purpose of use. According to an advantageous embodiment of the invention, the carbon felt layers have been made dimensionally stable prior to assembly with the thin, sheet-like carbon member or members through partial impregnation with a carbonaceous binder and subsequent temperature treatment, with the above-mentioned binders also being able to be used in this case. The partial impregnation, in which a portion of the impregnation agent is removed from the felt again, for example by squeezing-off said felt, so that the density thereof diminishes, is a means for adjusting the heat conductivity of the felt and, hence, of the entire carbon composite member.

There further is the possibility that the binder content of the plastic carbon composition (mass), of which the thin, sheet-like shaped carbon member has been produced, amounts to about 100% by weight, based on the filler material. The carbon residue remaining after carbonization of the binder in the polygranular carbon member is at about 35 to 70% by weight.

The filler material used for the thin, sheet-like carbon member can be of a granular or, respectively, pulverulant and/or fibrous and/or flaky kind, for example cokes, carbon blacks, natural or synthetic graphites, carbon fibers or the mixtures thereof. The thickness of the thin, sheet-like carbon member is usefully between 0.1 and 2.0 mm, and values of 20:1 to 1:1 have proved particularly advantageous for the ratio of the thickness of the carbon felt layers to the thickness of the sheet-like carbon members, which means that as a rule the felt layers have a greater thickness than the material layer which is formed by the shaped carbon member.

Methods are known for producing the carbon felts, viz. also the partially impregnated ones.

It is to be understood that a wide variety of plate-shaped carbon composite members is possible with the aid of the two above mentioned methods for producing the carbon composite members and their variations, insofar as the number of the individual layers, their arrangement within the composite member, hence, their position relative to one another and their thickness is concerned, and that it is also possible to produce actually any desired carbon composite member configurations through compression molding in compression molds with special pressing tools, which correspond to the configuration of the shaped article to be produced, or in veneer presses. For example, a plate-shaped carbon composite member can be deformed into arched areal members in the rude or "green" state, hence, when it still can be to a certain extent plastically deformed because the carbonaceous binder has not yet been temperature-treated and thus not been hardened, said parts retaining the shaped configuration after said temperature treatment.

The drawings 1–6 diagrammatically show a few exemplary embodiments of the carbon composite member according to the invention.

FIG. 1 shows a prospective view of an insulation element consisting of a carbon felt layer 3 with plane-parallel shaped, or uniformly thick, carbon members 1 and 2 adhesively attached on either side.

FIG. 2 shows a prospective view of a part of the carbon composite member curved in cup-shaped manner, which could likewise serve for insulation purposes, and which consists, as in the case of the embodiment of FIG. 1, of a center carbon felt layer 6 having a thickness of about 10 mm and of two shaped carbon member layers 4 and 5 adhesively attached to either side, whose thickness is about 1 mm.

FIG. 3 is an illustration in prospective of a single-layer tubular hollow member 7, which is formed of a sheet-like shaped carbon member, hence, has no carbon felt layer and insofar as that is concerned does not constitute any laminate but, rather, only the outer or the inner sheath of such a laminate.

FIG. 4 shows a prospective view of a part of a carbon composite member made up of five layers, which is utilized for example for high temperature purposes and consists of three felt layers 8, 9, 10 and of two shaped carbon member layers 11, 12, which are embedded between said felt layers, to which they are adhesively attached. That kind of plate-shaped composite members can be produced depending upon the technical possibilities of production to have any desired sizes, for example also in the form of relatively large plates of an edge length of 700×2000 mm.

The forms shown in FIGS. 5 and 6 show further examples in respect of the many and varied possibilities of design and, hence, also use offered by the carbon composite member according to the invention, with FIG. 5 showing a prospective view of a multi-layer insulation member having stepped outer edges. In this case, two plane-parallel carbon felt layers 13, 14 are separated by a thin, sheet-like shaped carbon member 16 and are covered on their top side as well as on their underside by like, dimensionally stable shaped carbon members 15 and 17 in a manner such that said shaped members at the left side project beyond the edges of the felt layers by a distance corresponding to the width of the uncovered felt layer surfaces 18, 19 on the right side of the composite member. The material layers or plies 13, 14, 15, 16, 17 that are adhesively joined together in this way form a groove and tongue member, which can be assembled with members of like kind by means of putting them together to form larger surface area structures, without this requiring any particular elements of connection.

The embodiment of a carbon composite member shown in FIG. 6 illustrates a plan view of a hollow member assembled of four plate-shaped composite members 20 to form a rectangular tube, the inner cavity of which hollow member is designated by 22. The sheet-like carbon members 25 covering the felt layer 21 on either side produced on one side at 23 on the exterior of each composite member 20 so as to thereby cover the front end of the composite member arranged to follow at right angles, while a partial surface on the inner side of each composite member, as shown at 24, is not covered by the sheet-like carbon member, the width of which partial surface corresponds to the front end of the further composite member that is contiguous at right angles. In this manner, a rectangular tube results, whose exterior and interior sides are entirely covered by the sheet-like carbon members, so that no heat bridges form at the four junctions of the four composite members.

What is claimed is:

1. A self-supporting, dimensionally stable carbon composite member of a plurality of carbon layers bonded together, comprising one or more layers of carbon felts and one or more thin, uniformly thick polygranular carbon members adhesively joined to the former, said members consisting of granular or, respectively, pulverulant and/or fibrous carbon particles as fillers and of a coked binder, said carbon members being constructed of a rolled plastic carbon composition with a binder proportion of from 50 to 150% by weight, based on the filler material, and said carbon members, said carbon felt layers and said binder being thermally joined together with the binder arranged between the carbon felts and the carbon members and hardened to adhesively join the carbon members and carbon felt layers together.

2. A self-supporting, dimensionally stable carbon composite member of a plurality of carbon layers joined together, comprising one or more layers of carbon felts and one or more thin, uniformly thick polygranular carbon members adhesively attached to the former and consisting of granular or, respectively, pulverulant and/or fibrous carbon particles as filler materials and of a coked binder, each of said carbon member being formed from a green member of a plastic carbon composition having a binder content of from 50 to 150% by weight, based on the filler material, which composition has been subjected to shearing forces in joining said thin uniformly thick carbon member; and assembled with one or more of said layers of carbon felts; and said carbon members and said layers of carbon felts being thermally treated so that said binder in the carbon member is hardened and said carbon members and said carbon felt layers are joined together.

3. A carbon composite member as defined in claim 1 or 2, wherein the carbon materials, such as coke, carbon black, carbon fibers, natural or synthetic graphite and the mixtures thereof, are incorporated as filler.

4. A carbon composite member as defined in claim 1 or 2, wherein the carbon composite member consists of a felt layer and of two thin, uniformly thick carbon members covering said layer on either side.

5. A carbon composite member as defined in claim 1 or 2, wherein the carbon felt layers and said thin, uniformly thick carbon members are arranged alternatingly in sandwich-like manner within the carbon composite member.

6. A carbon composite member as defined in claim 1 or 2, wherein the carbon composite member is of tubular configuration.

7. A carbon composite member as defined in claim 1 or 2, wherein the individual layers are adhesively joined together through a binder, such as phenol formaldehyd resin, furan resin, tar, pitch or other mixtures.

8. A carbon composite member as defined in claim 1 or 2, wherein the carbon felt layer or layers prior to assembly with the thin, uniformly thick carbon member or members have been made dimensionally stable through partial impregnation with a carbonaceous binder and subsequent temperature treatment.

9. A carbon composite member as defined in claim 1 or 2, wherein the binder content of the plastic carbon composition (mass), of which the thin, uniformly thick carbon member has been produced, amounts to about 100% by weight, based on the filler material.

10. A carbon composite member as defined in claim 1 or 2, wherein after the temperature treatment the binder includes a carbon residue of from 35 to 70% by weight.

11. A carbon composite member as defined in claim 1 or 2, wherein the thickness of the thin, uniformly thick carbon member amounts to between 0.1 and 2.0 mm.

12. A carbon composite member as defined in claim 1 or 2, wherein the ratio of the thickness of the carbon felt layers to the thickness of the thin, uniformly thick carbon members is from 20.1 to 1.1.

13. A method of producing the carbon composite member, comprising producing a plastically deformable carbon composition from granular or, respectively, pulverulant and/or fibrous carbon particles as filler materials and of a carbonaceous binder; shaping that composition into a uniformly thick carbon member in a roller gap, which is defined by unheated rollers, under the influence of shearing forces at room temperature; subjecting that plate to a thermal treatment for condensation and/or coking of said binder; placing either individually or in plural number at least one carbon felt layer onto the thus formed uniformly thick carbon member and inseparably joining said layer to the plate through adhesive bonding.

14. A method of producing the carbon composite member, comprising producing a plastically deformable carbon composition from granular or, respectively, pulverulant and/or fibrous carbon particles as filler materials and of a carbonaceous binder; shaping that composition into a uniformly thick carbon member in a roller gap, which is defined by unheated rollers, under the influence of shearing forces at room temperature; placing onto that carbon member either a single or a plurality of at least one carbon felt layer; subjecting for the purpose of condensation and/or coking of the binder said layer member to a temperature treatment, by which the individual layers are inseparably joined together adhesively.

15. A method as claimed by claim 13 or 14, wherein the contact surfaces of said carbon felt layers with said uniformly thick carbon members are, prior to the temperature treatment, additionally acted upon with binder.

16. A method as claimed by claim 13 or 14, wherein the temperature treatment takes place under increased pressure.

17. A method as claimed by claim 13 or 14, wherein the stack of one or more thin uniformly thick carbon members and of one or more plane-parallel carbon felts is pressed together by means of a veneer press-like device.

* * * * *